2,710,879
Patented June 14, 1955

2,710,879

SYNTHESIS OF CARBOXYLIC ACIDS

John C. Snyder, Darling, Pa., assignor to Hercules Powder Company, Wilmington, Del., a corporation of Delaware No Drawing. Application March 29, 1952,
Serial No. 279,451

12 Claims. (Cl. 260—532)

This invention relates to the synthesis of organic carboxylic acids by the catalytic addition of carbon monoxide to an organic compound and, more particularly, to the use of zirconium as a liner for the reactor in which these syntheses are conducted.

The synthesis of organic carboxylic acids by the reaction of carbon monoxide with an alcohol, olefin, carboxylic acid ester, or ether is well-known. However, one of the difficulties encountered in the practical application of these syntheses is that under the conditions of high temperature and pressure required, the carboxylic acid which is produced is very corrosive. In addition to the corrosion caused by the acid which is produced is that which occurs when a catalyst is used which contains, among other ingredients, halogens or halides. These catalysts give higher yields and faster rates of reaction than are obtained with other catalysts, but it has not previously been possible to utilize them commercially because they have proved to be most corrosive and materials of construction which could be used in the absence of halogens or halides deteriorate very rapidly when they are present. Not only is there destruction of the apparatus but the catalyst is also destroyed, which results in lower yields and slower rates of reaction. For example, such metals as copper, silver, gold, stainless steels, etc., are very rapidly corroded in the synthesis of acetic acid using a nickel iodide catalyst. In fact, even such inert metals as palladium and platinum suffer such a degree of corrosion that their use is not economically feasible.

Now in accordance with this invention, it has been found that organic carboxylic acids may be synthesized by the reaction of carbon monoxide with an alcohol, olefin, ether, or carboxylic acid ester in the presence of a catalyst containing an element of the iron subgroup and an element selected from the group consisting of chlorine, bromine, and iodine by conducting the reaction in a reactor, the inner surfaces of which consist of a metal containing at least 90% zirconium. Zirconium is not only resistant to the highly corrosive conditions of these syntheses but it is also easily fabricated. Threaded and turned parts may be made entirely of zirconium and hence the reactor may either be lined with zirconium or zirconium may be used for the entire construction of the pressure vessel. The use of zirconium for the inner surfaces of the reactor makes it possible to conduct these syntheses at the temperatures and pressures required without any substantial product loss or deterioration of the catalyst or deterioration of the equipment due to corrosion.

The zirconium-lined apparatus is useful for any synthesis of an organic carboxylic acid involving the catalytic addition of carbon monoxide to an organic compound, and particularly so when an iron, cobalt, or nickel, or compounds thereof, catalyst is used in combination with chlorine, bromine, or iodine or compounds thereof. It is well-known that the combination of carboxylic acids and carbon monoxide is extremely corrosive at the high temperatures and pressures required for these syntheses, and it was most unexpected to find that zirconium was unaffected. Even more surprising was the discovery that zirconium was unaffected even when an iron subgroup element in combination with a halide was used as the catalyst.

Typical of the syntheses of organic carboxylic acids which may be carried out in the zirconium-lined apparatus in accordance with this invention is the synthesis of such an acid by the reaction of an alcohol with carbon monoxide. This reaction is applicable to any alcohol as, for example, any aliphatic, alicyclic, or aralkyl alcohol such as methanol, ethanol, propanol, isopropanol, butyl alcohol, amyl alcohol, cyclohexanol, terpineol, fenchyl alcohol, benzyl alcohol, etc. The temperatures and pressures used in this synthesis will, of course, depend upon the alcohol used, the catalyst used, etc., but, in general, temperatures of from about 200° C. to about 350° C. are used at pressures of from about 2,000 to about 15,000 p. s. i.

The zirconium-lined apparatus may also be used in the preparation of organic carboxylic acids by the reaction of an olefin with carbon monoxide in water as, for example, in the production of propionic acid from ethylene. The olefin from which the carboxylic acid is prepared may be any acyclic or alicyclic olefin or aromatic hydrocarbon containing an olefinic side chain. Exemplary of the olefins which may be used are ethylene, propylene, isobutylene, the pentenes, the hexenes, cyclohexene, menthene, camphene, styrene, etc. Again, the temperature and pressure used for the reaction will depend upon the olefin being used, the catalyst, etc.

Another reaction advantageously carried out in the zirconium-lined apparatus is in the production of organic carboxylic acids by the reaction of carbon monoxide with an ether. As is well-known, monocarboxylic acids are produced by reacting an ether with carbon monoxide and water. The reaction is applicable to any alkyl, cycloalkyl, aralkyl, or aryl ether, whether the two organic radicals attached to the ether oxygen atom are alike or different. For example, acetic acid may be produced from dimethyl ether and propionic acid from diethyl ether by the catalytic addition of carbon monoxide and water. In the same way, dicarboxylic acids are produced when carbon monoxide and water are added to a cyclic ether as, for example, in the preparation of adipic acid from tetrahydrofuran, etc.

Organic carboxylic acids may also be produced by the reaction of an ester of a carboxylic acid with carbon monoxide and water in the zirconium-lined apparatus. The ester may be any alkyl, cycloalkyl, aralkyl, etc., mono- or poly-hydric alcohol ester of any alkanoic, cycloalkanoic, aryl, or aralkyl carboxylic acid. For example, 2 moles of acetic acid may be prepared from 1 mole of methyl acetate, or 1 mole of acetic acid and 1 mole of propionic acid may be prepared by the reaction of ethyl acetate with carbon monoxide and water.

The following example will illustrate the use of zirconium-lined apparatus in the synthesis of organic carboxylic acids in accordance with this invention.

Example

One hundred forty-seven parts of methanol was mixed with 9.0 parts of nickel iodide and 7.4 parts of water, and the mixture was pressured to 1,200 p. s. i. with carbon monoxide at room temperature. The reaction mixture was then agitated and heated to 285° C., at which temperature the pressure was increased to 7,000 p. s. i. of carbon monoxide. The reaction was held at 285° C. and 6,800 to 7,000 p. s. i. for 6 hours. The product so obtained amounted to 221.5 parts and contained over 80% acetic acid. Examination of all of the zirconium surfaces which had been in contact with the reaction mixture during this synthesis showed that no corrosion had taken place, nor had any attack by the catalyst, reactants, or products occurred.

In all of the above syntheses, the reaction is advantageously carried out in a reactor, the inner surfaces of which are zirconium or a metal containing at least 90% zirconium. This is particularly true when the catalyst used is one which contains both an element of the iron subgroup and an element selected from the group consisting of chlorine, bromine, and iodine. For example, it is well-known that high yields of acid are obtained in these syntheses with such catalysts as a nickel catalyst in combination with a halide as, for example, iodine. While these catalysts give excellent results in the syntheses of organic carboxylic acids, it has not previously been possible to carry out such a preparation on a commercial scale because of the highly corrosive nature of the reaction even in apparatus lined with such an inert material as platinum. However, by using a reactor in which the surfaces are made of zirconium or a metal containing at least 90% zirconium, this corrosion problem is completely eliminated.

Exemplary of the catalyst combinations which may be used in the zirconium-lined apparatus for the synthesis of organic carboxylic acids in accordance with this invention are those catalyst combinations wherein an element of the iron subgroup of the Periodic Table, either in the form of the free metallic element or a compound thereof, is used in combination with a halogen selected from the group of chlorine, bromine, or iodine, either in their free elemental form or in the form of a compound thereof. For example, the iron, cobalt, or nickel may be used as a free metal either in a powdered form or in a nonpyrophoric form, or they may be used in the form of one of their compounds as, for example, the carbonyl, acetate, chloride, bromide, iodide, etc., thereof. The halogenic element may be used in the form of either the free element or in the form of a compound of one of these halogens as, for example, the hydrogen halide, the cuprous salt or other inorganic halide salt or as an organic halide such as methyl iodide, ethyl iodide, etc. Instead of using the metallic element or compound thereof in combination with the halogen or halide, the two elements may be combined in a single compound as exemplified by the use of nickel iodide, nickel bromide, or nickel chloride as the catalyst. Particularly outstanding results have been obtained in the use of powdered nickel or nickel in the form of nickel acetate, nickel carbonyl, or nickel iodide, in combination with an iodide as, for example, iodine, nickel iodide, bismuth iodide, cuprous iodide, hydrogen iodide, methyl iodide, etc.

In accordance with this invention, the reactor, in which these syntheses of organic carboxylic acids are conducted, is so fabricated that all parts of the acid synthesis apparatus coming into direct contact with the reactants or products while they are under the high pressures and temperatures prevailing in the synthesis are made of, plated with, or innerlined with a metal containing at least 90% zirconium. As pointed out above, the metal parts in contact with the heated reactants and products may be entirely constructed of a metal containing at least 90% zirconium, or the metal parts may consist of a plating or innerlining of a metal containing at least 90% zirconium held in place by other materials of construction capable of withstanding the temperature and pressure required for these syntheses. Any type of construction may be used so long as those parts of the apparatus which come into direct contact with the reactants or products at the high temperatures and pressures used are made of or lined with the zirconium metal. The zirconium is not only completely resistant to corrosion under the reaction conditions employed but is particularly outstanding in this use because of the ease with which apparatus may be fabricated from zirconium.

The zirconium-lined apparatus may be used for the synthesis of organic carboxylic acids in accordance with this invention by either a batchwise or continuous process, being particularly advantageous in the continuous process. In the latter case, work stoppages which would occur with other metals because of corrosion of the apparatus are completely eliminated when the zirconium-lined apparatus is used for these syntheses.

What I claim and desire to protect by Letters Patent is:

1. In the synthesis of organic carboxylic acids by the catalytic addition of carbon monoxide to an organic compound selected from the group consisting of alcohols, olefins, ethers, and carboxylic acid esters, wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% zirconium.

2. In the synthesis of an organic carboxylic acid by the catalytic addition of carbon monoxide to an alcohol wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% zirconium.

3. In the synthesis of an organic carboxylic acid by the catalytic addition of carbon monoxide and water to an olefin wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% zirconium.

4. In the synthesis of an organic carboxylic acid by the catalytic addition of carbon monoxide and water to an ether wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% zirconium.

5. In the synthesis of an organic carboxylic acid by the catalytic addition of carbon monoxide and water to an ester of a carboxylic acid wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% zirconium.

6. In the synthesis of organic carboxylic acids by the catalytic addition of carbon monoxide to an organic compound selected from the group consisting of alcohols, olefins, ethers, and carboxylic acid esters, wherein the reaction is carried out in the presence of a catalyst containing nickel and iodine, the step which comprises conducting the reaction in a reactor, the inner surfaces of which consist of a metal containing at least about 90% zirconium.

7. In the synthesis of an organic carboxylic acid by the catalytic addition of carbon monoxide to an alcohol wherein the reaction is carried out in the presence of a catalyst containing nickel and iodine, the step which comprises conducting the reaction in a reactor, the inner surfaces of which consist of a metal containing at least about 90% zirconium.

8. In the synthesis of an organic carboxylic acid by the catalytic addition of carbon monoxide and water to an olefin wherein the reaction is carried out in the presence of a catalyst containing nickel and iodine, the step which comprises conducting the reaction in a reactor, the inner surfaces of which consist of a metal containing at least about 90% zirconium.

9. In the synthesis of an organic carboxylic acid by the catalytic addition of carbon monoxide and water to an ether wherein the reaction is carried out in the presence of a catalyst containing nickel and iodine, the step which comprises conducting the reaction in a reactor, the inner surfaces of which consist of a metal containing at least about 90% zirconium.

10. In the synthesis of an organic carboxylic acid by the catalytic addition of carbon monoxide and water to an ester of a carboxylic acid wherein the reaction is carried out in the presence of a catalyst containing nickel and iodine, the step which comprises conducting the reaction in a reactor, the inner surfaces of which consist of a metal containing at least about 90% zirconium.

11. In the synthesis of acetic acid by the catalytic addition of carbon monoxide to methanol wherein the reaction is carried out in the presence of a catalyst containing nickel and iodine, the step which comprises conducting the reaction in a reactor, the inner surfaces of which consist of a metal containing at least about 90% zirconium.

12. In the synthesis of acetic acid by the catalytic addition of carbon monoxide to methanol wherein the reaction is carried out in the presence of nickel iodide as a catalyst, the step which comprises conducting the reaction in a reactor, the inner surfaces of which consist of a metal containing at least about 90% zirconium.

References Cited in the file of this patent

UNITED STATES PATENTS

| | | |
|---|---|---|
| 2,448,368 | Gresham et al. | Aug. 31, 1948 |
| 2,448,375 | Larson | Aug. 31, 1948 |
| 2,593,440 | Hagemeyer | Apr. 22, 1952 |

FOREIGN PATENTS

| | | |
|---|---|---|
| 707,260 | France | Dec. 8, 1930 |

OTHER REFERENCES

Gee et al.: Ind. Eng. Chem., vol. 41, pp. 1668–1673 (1949).